Patented Dec. 22, 1925.

1,566,498

UNITED STATES PATENT OFFICE.

CHARLES N. MILLER, OF SAN FRANCISCO, CALIFORNIA.

PROCESS FOR MAKING WATERPROOF PORTLAND CEMENT.

No Drawing.   Application filed February 26, 1924.   Serial No. 695,375.

*To all whom it may concern:*

Be it known that I, CHARLES N. MILLER, a citizen of the United States, and a resident of San Francisco, county of San Francisco, and State of California, have invented a new and useful Process for Making Waterproof Portland Cement, of which the following is a specification.

This invention relates to cements, such as natural Portland, synthetic Portland cement or any other hydraulic or caustic cement such as plasters, Keene cements, calcimines or any cementitious materials having hydraulic properties and capable of yielding products possessing bonding qualities analagous to those possessed by Portland cements and other hydraulic cements.

This new and improved process particularly concerns certain improved methods and reagent additions imparting to such cements or cementitious materials superior waterproofing qualities, greater plasticity and quick hardening qualities whereby a more desirable, tougher and more impervious product is obtained.

One object of this invention is to formulate a process whereby a commercial chemical such as a certain coal tar derivative, either alone or with a slight admixture of a nonvolatile oil, which may be either of a saponifiable or nonsaponifiable character, is thoroughly incorporated into and made a uniform part of a Portland cement, or other cementitious material, during its course of manufacture.

A further object of this invention is to describe a process whereby a waterproof cement, or cementitious material is produced at reasonable and practical cost.

A further object of this invention is to formulate a process whereby it is possible to produce a cement having waterproof qualities and which will permanently retain its original desirable qualities.

Unto the present time cements have been waterproofed by the addition of soaps, fatty acids to the cement, either during its course of manufacture or later on at the job of placing the concrete. These methods do not yield a perfectly uniform or waterproof cement and are expensive as well on account of the large amount of additional material required to perform the work intended. A later method utilizes the addition of a mixture of nonsaponifiable and saponifiable oils to the cement during its course of manufacture. This results in a coating of the individual cement particles with an inert, or chemically inactive, material. The effect therefore is a purely physical or mechanical one, for while such cement possesses water repulsing properties while in a dry state this property is perforce overcome when such cement is mixed with the aggregate, for cement will not mix or yield a mortar until it is thoroughly wetted and thus in a condition to combine with the required water in order to complete the intended chemical reaction involved and required for a setting and hardening of the mix.

My present invention resides primarily in mixing a small amount of beta naphtol, whose chemical formula corresponds to the symbol $C_{10}H_7(OH)$ and a small amount of mineral oil with the cement during its natural course of manufacture and without the use of an intermediate agent.

In carrying out my process I prefer to bring about the desired result by mixing a small amount of beta naphtol, either alone or in combination with a small amount of mineral oil with the cement during its course of manufacture, and I do this by adding the required amounts of each to the ground clinker as it passes on its way from the ball mills to the tube mills; in other words, I add my reagents directly to and prior to the final grinding stage of the cement or cementitious material.

I prefer to add the beta naphtol by weighing same in powder or lump form on small automatic scales in its proper ratio and proportion to the cement passing over other and similar scales; the oil I prefer to add from an automatic feeding machine such as are used in oil-flotation work. I may, however, desire to bring the beta naphtol into a soluble form, using suitable solvents, incorporate my oil in its proper proportion and feed both automatically from an oil feeder as above described.

Furthermore, while I prefer and advocate the addition of my reagents to the cement during its final grinding stage I do not necessarily limit myself thereto and may add the reagents at any other suitable and convenient part of the cement manufacturing process.

It is also feasible to incorporate the reagents into a cement or cementitious material, after such material has passed the hands of the manufacturer, by regrinding such cements or cementitious materials in a small pebble or tube mill, and if no other means be available such incorporation could even be effected within a concrete mixture, although possibly not as thoroughly.

For my oil I prefer to use a liquid mineral oil as being the cheapest and easiest to handle; of such I use an amount of from .02% to .25%.

Of the beta naphtol I use an amount of from .05 to 5.0%, and preferably .15% if used in combination with oil, based upon the weight of the cement or cementitious material, but I do not limit myself to these proportions as different cements require different amounts and the object to be attained in special cases may require a shifting of these percentages.

By experimentation it has been proven that .15% of beta naphtol and .10% of oil by weight added to 99.75% of dry cement by the process herein described will yield a highly plastic cement, a cement of quicker hardening propensities, and one possessing superior waterproofing qualities. The amount of oil may even be increased to .25% with favorable results, but it should be noted that a further addition of oil has a tendency to lessen the tensile strength of the concrete made of the cement.

It has been shown that cement thus treated shows only a faint increase in setting time over untreated cement, will harden quicker than the untreated cement; such cement; will have tougher qualities than untreated cement and will resist water better, and will show water repellent qualities even after test placques have been subjected to the steam test for ten hours.

By adding the reagents, as named, directly to the cement during the final grinding stage an absolutely uniform product is obtained and while heat is not absolutely necessary to the success of this process I prefer to utilize heat during the grinding stage as it seems to aid a thorough dissemination of the reagents within the cement mass and may use for this purpose temperatures up to and inclusive of 212 degrees Fahrenheit. The average tube mill temperature during the grinding stage reaches 185 degrees Fahrenheit and for all practical purposes I have found this temperature to be sufficient.

Cement thus prepared and placed into a glass container, where action may be observed, will readily demonstrate its water repellent qualities and will therefore resist the absorption of moisture or water while in storage and transit much better than untreated cement.

In cements thus prepared the beta naphtol will act only after the cement has been thoroughly wetted and then only very slowly. The reaction does not appear to complete until several days after the final set has been reached and thus the water repellent propensities become of a more permanent nature than has been attained by previous processes, and such reaction is not accompanied by expansion or internal stresses.

The small amounts of the reagents required for effecting the desired results by this process, their comparatively low cost and the relatively large difference in price between untreated cements and waterproof cements renders this process economically possible on account of its only slightly higher manufacturing costs over untreated cements.

I claim:

1. The process of preparing waterproof cement which consists in thoroughly mixing "beta naphtol" of the formula $C_{10}H_7(OH)$ into cementitious material.

2. The process of preparing waterproof cement which consists in thoroughly incorporating into a cementitious material a mixture of beta naphtol and non-volatile oil.

3. The process of preparing waterproof cement which consists in thoroughly incorporating into a cementitious material a mixture of beta-naphtol and non-volatile oil in such amounts as not to destroy the alkaline reactivity of the cementitious material.

4. The process of preparing waterproof cement which consists in thoroughly incorporating into a cementitious material a mixture of beta naphtol and non-volatile oil in such small amounts as not to destroy the hydraulic qualities of the cementitious material.

5. The process of preparing waterproof cement which consists in thoroughly incorporating into a cementitious material a mixture of beta naphtol and non-volatile oil in substantially the proportion of 99.60 and 99.75 parts of cementitious material, .15 parts of beta-naphtol and .10 to .25 parts of oil.

CHARLES N. MILLER.